US011989334B2

(12) United States Patent
Meyer

(10) Patent No.: US 11,989,334 B2
(45) Date of Patent: May 21, 2024

(54) CONTROL DEVICE FOR A MOTOR VEHICLE, AND MOTOR VEHICLE

(71) Applicant: Audi AG, Ingolstadt (DE)

(72) Inventor: Jürgen Meyer, Haunstetten (DE)

(73) Assignee: AUDI AG, Ingolstadt (DE)

( * ) Notice: Subject to any disclaimer, the term of this patent is extended or adjusted under 35 U.S.C. 154(b) by 157 days.

(21) Appl. No.: 17/622,487

(22) PCT Filed: Jun. 26, 2020

(86) PCT No.: PCT/EP2020/068009
§ 371 (c)(1),
(2) Date: Dec. 23, 2021

(87) PCT Pub. No.: WO2020/260573
PCT Pub. Date: Dec. 30, 2020

(65) Prior Publication Data
US 2022/0237331 A1 Jul. 28, 2022

(30) Foreign Application Priority Data

Jun. 27, 2019 (DE) ................. 10 2019 209 355.8

(51) Int. Cl.
*G06F 21/00* (2013.01)
*B60R 16/02* (2006.01)
(Continued)

(52) U.S. Cl.
CPC ............. *G06F 21/74* (2013.01); *B60R 16/02* (2013.01); *G06F 21/606* (2013.01); *G01S 19/37* (2013.01)

(58) Field of Classification Search
CPC .................. G06F 21/74; G06F 21/606; G06F 2221/2111; B60R 16/02; G01S 19/37; G01S 19/14; G01S 19/35
See application file for complete search history.

(56) References Cited

U.S. PATENT DOCUMENTS 8,577,031 B2   11/2013  Asperger et al.
8,601,281 B2   12/2013  Plankenhorn et al.
(Continued)

FOREIGN PATENT DOCUMENTS

DE    102004014435 A1   11/2005
DE    102008061710 A1    6/2010
(Continued)

OTHER PUBLICATIONS

International Search Report and Written Opinion of the International Searching Authority directed to related International Patent Application No. PCT/EP2020/068009, dated Sep. 16, 2020, with attached English-language translation; 17 pages.
(Continued)

*Primary Examiner* — Kendall Dolly
(74) *Attorney, Agent, or Firm* — Sterne, Kessler, Goldstein & Fox P.L.L.C.

(57) ABSTRACT

The approach relates to a control device for a motor vehicle, that includes a printed circuit board having at least one microprocessor for providing functions of the control device. At least one security function of the functions is subject to a security requirement that is increased with respect to at least one other function of the functions. A security area is provided on the printed circuit board, in which area all the components provided for performing the security function, including at least one first microprocessor, are implemented so as to fulfill the security requirement. Any communication of the first microprocessor in and out of the security area, which communication at least partially uses the printed circuit board, takes place in an end-to-end encrypted manner. At least one second microprocessor, that does not meet the security requirement, provides the at least one other function outside the security area, and is arranged on the printed circuit board.

13 Claims, 1 Drawing Sheet

(51) Int. Cl.
*G06F 21/60* (2013.01)
*G06F 21/74* (2013.01)
*G01S 19/37* (2010.01)

(56) References Cited

U.S. PATENT DOCUMENTS

| | | | |
|---|---|---|---|
| 10,103,889 B2 * | 10/2018 | Bronk | H04W 12/06 |
| 10,664,413 B2 | 5/2020 | Fons et al. | |
| 2018/0259651 A1 | 9/2018 | Antoni et al. | |
| 2019/0386969 A1 * | 12/2019 | Verzun | G06F 21/606 |
| 2022/0141631 A1 * | 5/2022 | Willmann | B60R 25/24 |
| | | | 340/12.5 |

FOREIGN PATENT DOCUMENTS

| | | | | |
|---|---|---|---|---|
| DE | 102012213155 A1 * | 2/2014 | | G06F 21/74 |
| DE | 102012213155 A1 | 2/2014 | | |
| DE | 102015214791 A1 | 2/2017 | | |
| DE | 102017124399 A1 | 8/2018 | | |
| DE | 102017202347 A1 | 8/2018 | | |
| EP | 3454088 A1 | 3/2019 | | |
| WO | WO 2017/080556 A1 | 5/2017 | | |
| WO | WO 2018/039134 A1 | 3/2018 | | |
| WO | WO 2018/169590 A1 | 9/2018 | | |

OTHER PUBLICATIONS

International Preliminary Report on Patentability directed to related International Patent Application No. PCT/EP2020/068009, completed Feb. 10, 2021, with attached English-language translation; 13 pages.

* cited by examiner

CONTROL DEVICE FOR A MOTOR VEHICLE, AND MOTOR VEHICLE

TECHNICAL FIELD

The approach relates to a control device for a motor vehicle, comprising least one printed circuit board having at least one microprocessor for providing functions of the control device, wherein at least one security function of the functions is subject to a security requirement, in particular ASIL level, that is increased with respect to at least one other function of the functions. The approach also relates to a motor vehicle having such a control device.

BACKGROUND

With the electronization of various functions in motor vehicles, the number of control devices is increasing. Control devices in motor vehicles typically include a printed circuit board on which the various electronic components required for performing the functions, in particular including at least one microprocessor, are arranged. Modern, new functionalities, in particular those that are related to the fully automatic driving of motor vehicles, must be specially secured. Security requirements are therefore placed on such security functions, for example according to a specific standard.

For this purpose, ISO 26262 ("road vehicles—functional safety") was introduced with regard to motor vehicles. This standard applies to security-relevant electronic systems in motor vehicles, in particular also to control devices and, among other things, defines specific security levels, the so-called ASIL levels (automotive safety integrity level). These special security requirements relate on the one hand to the hardware and on the other hand to the software.

As soon as a single function carrying out in a control device, which is referred to below as a security function, has a security requirement, in particular an ASIL level, the entire control device is to be interpreted with respect to the security requirement of the security function, regardless of whether the other functions of the control device have a lower security requirement or no security requirement at all. In other words, the design of the hardware and the software of the control device is currently specified by the highest possible security requirement among the various functions to be performed by the control device.

This is to be assessed as problematic in particular if the security function, which consequently has the high security requirement, is not necessarily used in every motor vehicle in which the control device is used. For example, control devices for motor vehicles have already been developed that only require a specific security function in specific expansion levels, for example in cases in which only 5% of the control devices produced require the security function at all in their lifetime. Due to the development according to the security requirements of the security function, the basic project is heavily impacted, which should, however, be as inexpensive as possible. The high security requirements result in special hardware components and strict specifications for the software.

Important functions in motor vehicles to which security requirements are assigned, which consequently form security functions, are those that supply position data. In particular, the GNSS functions (GNSS—global navigation satellite system), for example GPS functions, should be mentioned here. When locating such GNSS functions in control devices, it was suggested that GNSS receivers which fulfill the security requirements be installed on the printed circuit board, whereby the software that determines the position data runs in the microprocessor (also microcontroller, μC), which microprocessor must meet the corresponding security requirement, for example ASIL level. The software must also be developed accordingly.

WO 2018/169590 A1 relates to achieving an improved ASIL classification through cooperative position specification. It is proposed, in addition to a GNSS localization of the motor vehicle, also to carry out a localization based on communication data from other vehicles. Location regions are specified, a level of reliability of the position accuracy being increased when the location regions overlap.

WO 2017/080556 A1 relates to a method and a device for evaluating a position of a vehicle, in particular according to an ASIL security level. There, a first absolute position is to be specified by means of a conventional GNSS receiver, which is to be compared with a second absolute position, which, however, is determined in a secured security unit or a secured ASIL-capable chip and is therefore always plausible.

EP 3 454 088 A1 relates to systems and methods for providing an ASIL identifier for a GNSS position. It is proposed there to carry out hardware platform diagnostics and to execute a RAIM algorithm in order to specify a protection level. An indicator for the ASIL "good" or an indicator for the ASIL "bad" should be determined from the results.

BRIEF DESCRIPTION OF DRAWINGS/FIGURES

DETAILED DESCRIPTION

Figure 1:
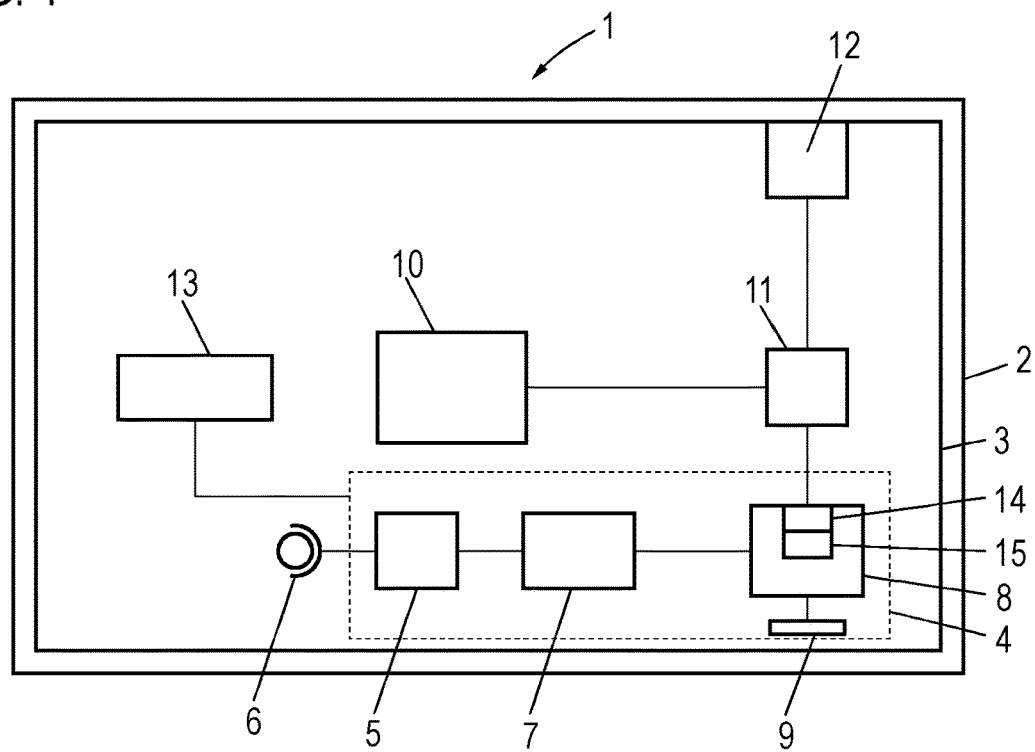
FIG. 1 is a schematic diagram of a control device according to certain aspects of the invention.

The approach is based on the object of providing a control device which is suitable for performing a security function with a security requirement and which is simpler and more cost-effective to develop and construct.

To achieve this object, it is provided according to aspects of the invention in the case of a control device of the type mentioned at the outset that a security area is provided on the printed circuit board, in which area all the components provided for performing the security function, including at least one first microprocessor, are implemented so as to fulfill the security requirement, wherein any communication of the first microprocessor in and out of the security area, which communication at least partially uses the printed circuit board, takes place in an end-to-end encrypted manner, and wherein at least one second microprocessor, in particular that does not meet the security requirement, for providing the at least one other function outside the security area, is arranged on the printed circuit board.

The security requirement is in particular an ASIL level in accordance with ISO 26262, in particular ISO 26262:2018. According to aspects of the invention, it is therefore proposed to create a kind of separate "island" on the printed circuit board for the security function comprising the security requirement, which in itself ensures the corresponding security requirement, in particular the ASIL level, and is developed accordingly. All data that is read in or output from the "island," i.e. the security area, is already E2E-secured, i.e. secured by end-to-end encryption. For this purpose, it can be provided in particular that each communication link leading out of the security area preferably has an E2E decryption and encryption means, in particular at its interface located in the security area and/or in the first microprocessor. In particular, such an interface can therefore be part of the first microprocessor. By providing a security area for the components of the security function, it is made possible that the rest of the control device does not have to be developed in accordance with the security requirements of the security function, so that costs can be saved in the basic project and only have to be invested in any additional equipment that can be assigned in accordance with a function, in this case the security function. In particular, it is therefore possible for manufacturers to let users of the motor vehicle pay for the additional equipment.

It is particularly useful if the security function is a GNSS function that provides position data for the motor vehicle, in particular a GPS function. A GNSS island, in particular an ASIL-GNSS island, then emerges as part of the control device on the printed circuit board in the form of the security area, which island can ultimately be provided in the form of an assembly option so that, for example, the control device can initially be developed for the other functions, in which case, if a GNSS function is desired, the corresponding components can be optionally equipped, which components were specifically developed for the GNSS function and in accordance with the security requirements.

In other words, an assembly option for the GNSS island is created on the printed circuit board of the control device, the corresponding components necessary for the GNSS function being located within this island, i.e. the security area. Specifically, it can be provided that the components of the security area, in addition to the first microprocessor, include a GNSS antenna and/or a GNSS receiver and/or at least one high-frequency component, in particular a filter and/or a bandpass, and/or an inertial measuring unit (IMU). In particular the high-frequency components (HF filters, bandpass filters, etc.), the GNSS receiver(s), the IMU, and the first microprocessor, which microprocessor in the case of an ASIL level can then also be referred to as ASIL-μC, are located within the security area. The components of the security area were developed in accordance with the security requirements, in particular in accordance with ISO 26262, and are also approved accordingly. The rest of the control device will continue to be developed in accordance with the usual quality management requirements (QM).

The first microprocessor provides its position data in an already E2E-secured manner, in particular at one of its interfaces, for example an Ethernet interface. Thus, no further measures need to be taken on the control device or in the motor vehicle as a whole.

It can also generally be provided that the first microprocessor, as a component communicating in particular via Ethernet from the security area, has an interface for providing E2E-encrypted communication data. If the first microprocessor also has further interfaces, these are also expediently designed for E2E-encrypted communication.

The first and second microprocessors can advantageously be connected to a switch located outside the security area, and/or a power supply unit common for the entire printed circuit board including the security area can be provided on the printed circuit board. A switch and/or a power supply unit can therefore be used appropriately as electronic components both for the security area and for the rest of the area outside the "island," in particular if the security requirements do not place any special demands on such components.

In addition to the control device, aspects of the invention also relate to a motor vehicle comprising at least one control device according to aspects of the present invention. All statements relating to the control device according to aspects of the invention can be analogously transferred to the motor vehicle according to aspects of the invention, with which the already mentioned advantages can thus also be obtained.

In particular, an advantageous development of the motor vehicle according to aspects of the invention provides that it has at least one computing device which provides communication data for the security area and is designed to send the communication data to the control device in E2E-encrypted form. In a particularly advantageous development of aspects of the present invention, if the security function is a GNSS function that provides position data, the communication data relate to a correction service in order to increase the position accuracy, for example a dGPS and/or information on atmospheric fluctuations. These can be transmitted from the corresponding backend, i.e. the computing device, to the security area, specifically up to the first microprocessor, in an E2E-secured manner, so that an appropriate configuration is expediently given if the computing device is provided within the motor vehicle.

If the communication data, for example relating to atmospheric fluctuations, come from a backend server outside the motor vehicle, it can be provided that they are already E2E-encrypted there. It is also possible, however, for the computing device to be a communication device of the motor vehicle that receives the communication data that may be otherwise encrypted or unencrypted from a backend server. Then, of course, the communication device or at least the component handling this communication data must also be designed in accordance with the security requirement. This also applies accordingly to other computing devices within the motor vehicle which can deliver communication data to the security area for the security function.

Further advantages and details of aspects of the present invention will become apparent from the embodiments described below and with reference to the drawings.

FIG. 1 shows a control device 1 according to aspects of the invention, which comprises a printed circuit board arranged, for example, within a housing 2. Since the control device 1 is to execute a security function, in this case a GNSS function, to which a security requirement, in this case an ASIL level, is made, the control device 1 comprises a security area 4, which in the present case can also be referred to as an ASIL-GNSS island. All of the components required for performing the GNSS function are located within this security area 4, which area is only optionally equipped during manufacture. In the present case, these comprise high-frequency components 5 which are coupled to a GNSS antenna 6, at least one GNSS receiver 7, a first microprocessor 8, and an inertial measuring unit 9 (IMU). All of these components 5, 7, 8, 9 have been developed in accordance with the security requirement, both in terms of hardware and, if applicable, software.

A second microprocessor 10 is provided on the printed circuit board 3 for performing the other functions of the control device 1 that do not have to meet the security requirements for the GNSS function (or have to meet lower security requirements). Accordingly, this was not developed according to the higher security requirements of the GNSS function. Both the first microprocessor 9 and the second microprocessor 10 are connected via a switch 11 to a physical interface 12 of the control device 1, for example a CAN bus interface or the like. Both the components of the security area 4 and the other components on the printed circuit board 3 are fed by a common power supply 13.

All outgoing and incoming communication via an interface 14 of the first microprocessor 8 is E2E-encrypted (end-to-end encrypted). This can be done in particular by using an E2E decryption and encryption means 15, which can also form part of the interface 14.

Figure 2:
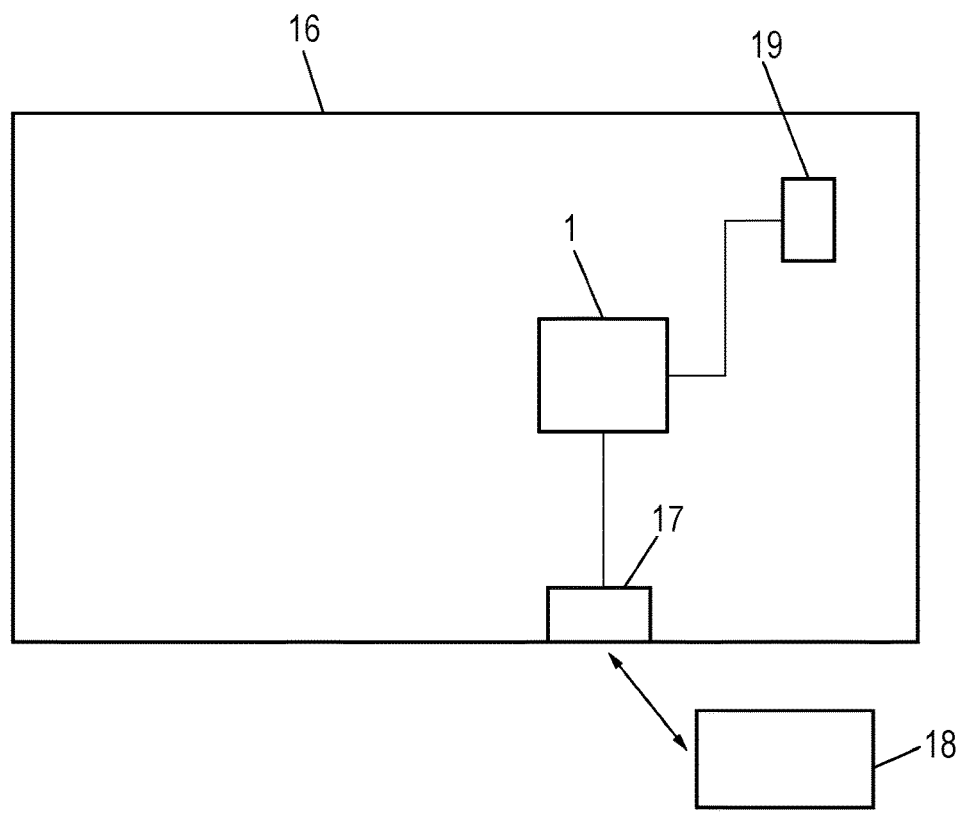
FIG. 2 is a schematic diagram of a motor vehicle according to certain aspects of the invention.

FIG. 2 is a schematic diagram of a motor vehicle 16 according to aspects of the invention. The motor vehicle 16 has at least one control device 1, which is designed as explained with reference to FIG. 1. In the present case, the control device 1 also communicates with a communication device 17 of the motor vehicle 16, which is in communication with at least one computer device 18 external to the vehicle, in this case a back-end device that supplies communication data for more precise execution of the GNSS function, for example communication data on current atmospheric fluctuations and/or to a dGPS function, which are already suitably E2E-encrypted in the computing device 18, so that they can be delivered directly to the control device 1 by the communication device 17 and to the first microprocessor 8 by means of the switch 11.

It is also conceivable to provide a computing device 19, which supplies such communication data for a security function, in particular the GNSS function, within the motor vehicle 16, in which case the security requirement must also be met there accordingly and the E2E encryption of the communication data must be implemented. If the communication data is supplied by the computing device 18 in unencrypted form, for example, encryption can also take place as a further computing device in the communication device 17, taking into account the security requirements, so that the E2E protection is ensured up to the first microprocessor 8.

The invention claimed is:

1. A control device for a motor vehicle, the control device comprising:
a printed circuit board having at least two microprocessors for providing functions of the control device, the at least two microprocessors including a first microprocessor and a second microprocessor,
wherein a security function of the functions is subject to a first security requirement that is greater than a second security requirement that applies to at least one other function of the functions,
wherein the printed circuit board includes a security area, in which components are provided for performing the security function and are configured to fulfill the first security requirement, the components including the first microprocessor,
wherein a communication of the first microprocessor into and out of the security area uses at least partially the printed circuit board, the communication being end-to-end (E2E) encrypted, and
wherein the second microprocessor does not meet the first security requirement and provides the at least one other function outside the security area, the second microprocessor being arranged on the printed circuit board.

2. The control device according to claim 1, wherein the security function is a geospatial navigation satellite system (GNSS) function that provides position data for the motor vehicle.

3. The control device according to claim 2, wherein the components of the security area, in addition to the first microprocessor, include at least one of a GNSS antenna, a GNSS receiver, at least one high-frequency component, or an inertial measuring unit.

4. The control device according to claim 1, wherein the first microprocessor, as a component communicating from the security area, has another interface for providing E2E-encrypted communication data.

5. The control device according to claim 1, wherein the first microprocessor and the second microprocessor are connected to a switch located outside the security area.

6. The control device according to claim 1, wherein the first security requirement of the security function has an Automotive Safety Integrity Level (ASIL) security requirement.

7. The control device according to claim 5, wherein the first microprocessor and the second microprocessor are connected to a physical interface of the control unit via a switch.

8. A motor vehicle comprising:
a control device comprising:
a printed circuit board having at least two microprocessors for providing functions of the control device, the at least two microprocessors including a first microprocessor and a second microprocessor,
wherein a security function of the functions is subject to a first security requirement that is greater than a second security requirement that applies to at least one other function of the functions,
wherein the printed circuit board includes a security area, in which components are provided for performing the security function and are configured to fulfill the first security requirement, the components including the first microprocessor,
wherein a communication of the first microprocessor into and out of the security area uses at least partially the printed circuit board, the communication being end-to-end (E2E) encrypted, and
wherein the second microprocessor does not meet the first security requirement and provides the at least one other function outside the security area, the second microprocessor being arranged on the printed circuit board.

9. The motor vehicle according to claim 8, further comprising:
a computing device that provides communication data for the security area and is configured to send the communication data to the control device in an E2E-encrypted form.

10. The control device according to claim 5, wherein the first microprocessor and the second microprocessor are connected to a power supply unit that is common for the printed circuit board including the security area, and wherein the power supply unit is provided on the printed circuit board.

11. The control device according to claim 7, wherein the switch is configured to direct communication data for the security function to the security area, wherein the communication data for the security function is incoming from a computer device external to the motor vehicle.

12. The motor vehicle according to claim 8, wherein the control device further comprises a switch configured to direct communication data for the security function to the security area, wherein the communication data for the security function is incoming from a computer device external to the motor vehicle.

13. The motor vehicle according to claim 8, further comprising a communication device configured to communicate with a computer device external to the motor vehicle.

\* \* \* \* \*